April 17, 1928.

W. B. STONE

SAWING MACHINE

Filed May 19, 1926

Inventor
Walter B. Stone
by
Augustus B. Stoughton
atty

April 17, 1928.
W. B. STONE
1,666,632
SAWING MACHINE
Filed May 19, 1926   2 Sheets-Sheet 2
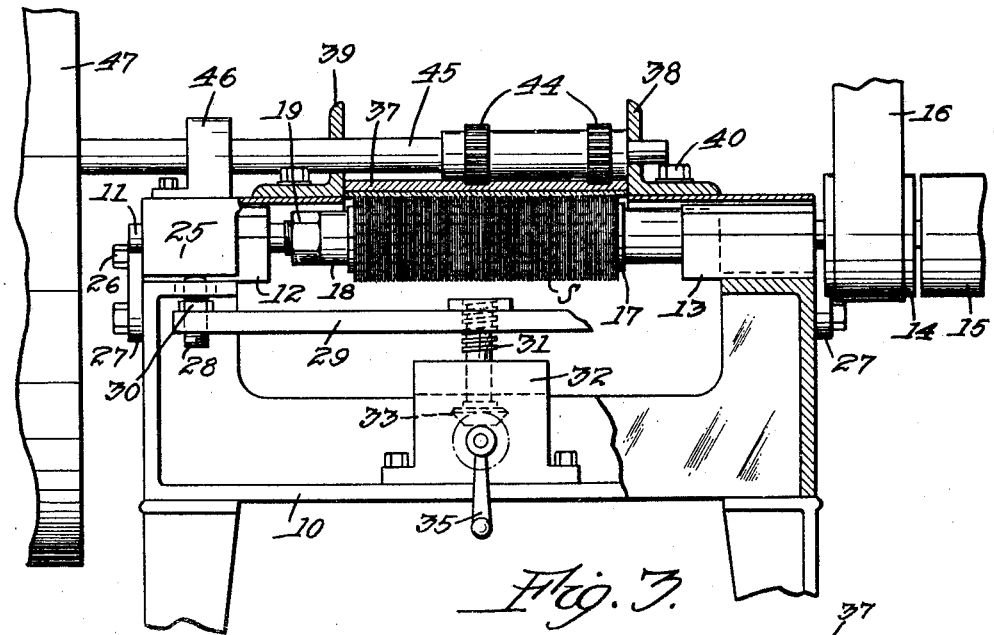
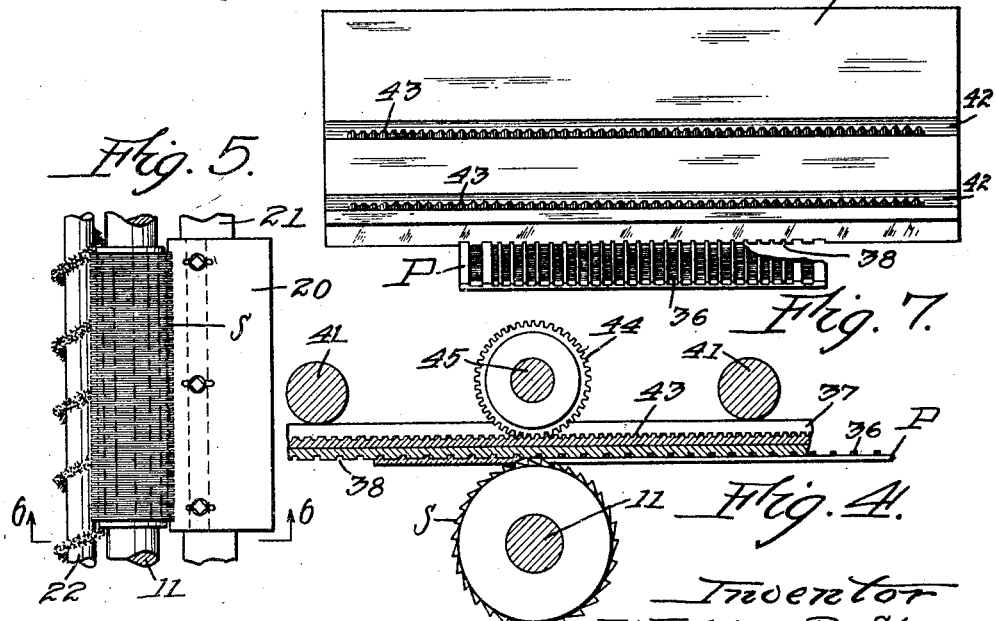
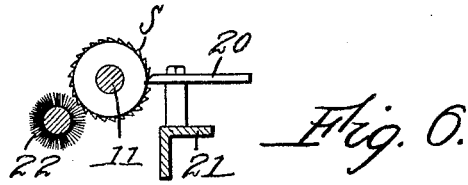
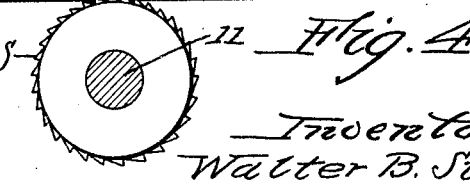

Patented Apr. 17, 1928.

1,666,632

UNITED STATES PATENT OFFICE.

WALTER BARNARD STONE, OF WEBSTER, MASSACHUSETTS, ASSIGNOR TO THE ELECTRIC STORAGE BATTERY COMPANY, OF PHILADELPHIA, PENNSYLVANIA, A CORPORATION OF NEW JERSEY.

SAWING MACHINE.

Application filed May 19, 1926. Serial No. 110,111.

This invention relates to a sawing machine particularly adapted for sawing a large number of closely adjacent parallel slots in a sheet of thin material such as a battery separator plate.

It is the general object of my invention to provide a sawing machine for such purposes, so constructed that a great number of closely adjacent slots may be cut simultaneously, and with great accuracy both as to depth and spacing.

My invention further relates to certain arrangements and combinations of parts which fill be hereinafter described and more particularly pointed out in the appended claims.

A preferred form of the invention is shown in the drawings in which

Fig. 3 is a partial front elevation, with certain parts shown in section;

Fig. 4 is an enlarged detail sectional side elevation, taken along the line 4—4 in Fig. 1;

Fig. 5 is a detail plan view of certain parts;

Fig. 6 is a detail sectional view, taken along the line 6—6 in Fig. 5; and

Fig. 7 is a perspective view of a carrier plate to be described.

Figure 1:
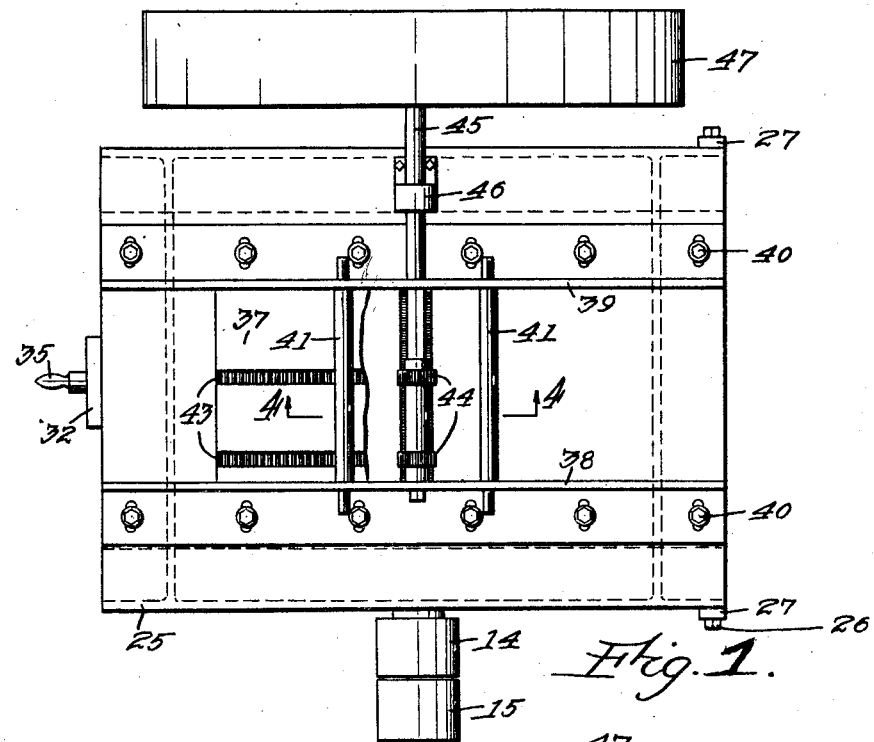
Fig. 1 is a plan view of my improved sawing machine.

Referring to the drawings, my improved sawing machine comprises a base or frame 10 on which a saw shaft 11 is rotatably mounted in fixed bearings 12 and 13. The shaft 11 may be provided with tight and loose pulleys 14 and 15, to be connected by a belt 16 to any suitable source of power. The shaft 11 is also provided with a flange or shoulder 17 and with a sliding collar 18 and a binding nut 19.

A plurality of saws S are mounted on the shaft 11, said saws being separated by spacing washers of the desired thickness, and being firmly clamped against the shoulder 17 by the collar 18 and nut 19. When the machine is used for sawing slots in separator plates, both the saws and the spacing washers are very thin, the slots being very narrow and very closely adjacent to each other.

A stripper plate or comb 20 (Figs. 5 and 6) is mounted on a cross bar 21, supported by the frame 10 and slotted to closely engage the saws S and remove the chips and shavings therefrom. A spirally arranged brush 22 is also preferably provided, said brush being positioned closely adjacent the saws S and being freely rotatable in suitable bearings by contact with the revolving saws. The combined action of the stripper 20 and the brush 22 effectively clears the saw teeth, which is very essential when operating upon such material as hard rubber.

Figure 2:
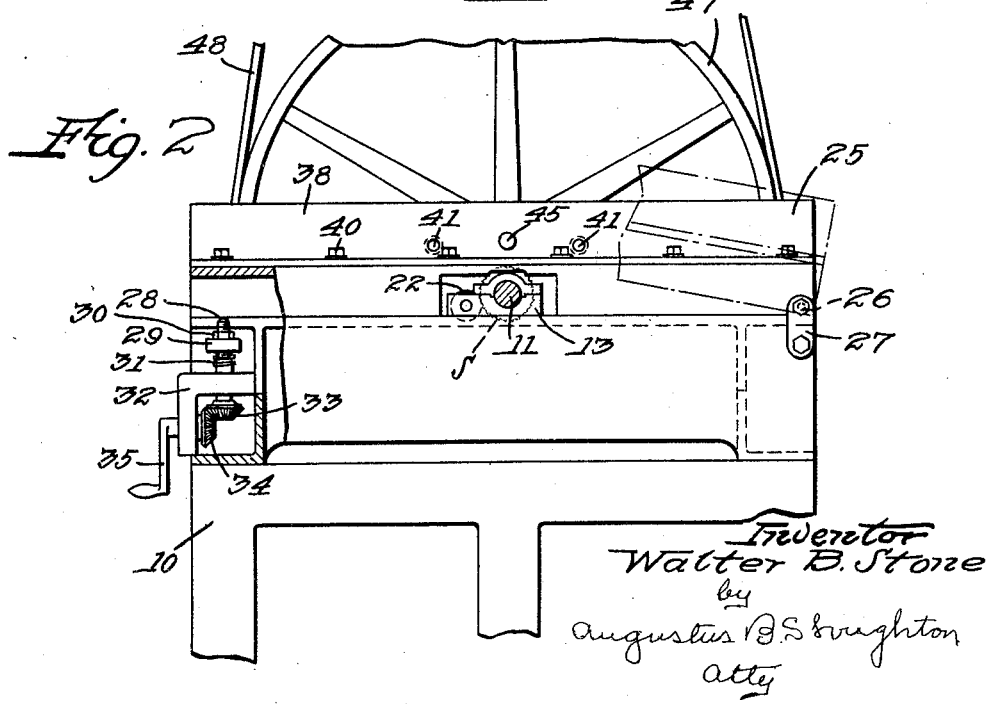
Fig. 2 is a partial side elevation thereof.

A saw table 25 (Fig. 2) is pivoted at 26 to ears or brackets 27 secured to the sides of the frame 10. The saw table 25 rests at its free edge upon stop screws 28 adjustably threaded into the ends of a cross bar 29 (Fig. 3) and secured therein by lock nuts 30. A table-adjusting threaded shaft 31 is mounted in a vertical bearing in a bracket 32 (Fig. 3) fixed to the frame 10 and is provided at its lower end with a bevel gear 33 (Fig. 2) meshing with a second bevel gear 34 mounted on a short shaft horizontally supported in the bracket 32 and provided with a handle 35 by which it may be manually rotated.

The threaded shaft 31 is threaded into the cross bar 29, so that rotation of the shaft 31 by the handle 35 will raise or lower the cross bar 29, and correspondingly raise or lower the free edge of the swinging saw table 25. The table may thus be accurately adjusted to vary the depth of cut made by the saws in the battery plate or other article being slotted. The saw table 25 is also freely movable upward about its pivot 26, when it is desired to obtain access to the saws S for sharpening or replacement.

I will now describe the mechanism which I have provided for holding the battery separator plate P or other similar article during the sawing operation. The plate P, as shown in Figs. 4 and 7, has a number of transverse ribs 36 on one of its surfaces and a carrier plate 37 is provided which has a corresponding number of transverse slots 38 in its lower surface, adapted to receive the ribs 36.

The carrier plate 37 is slidable longitudinally in the machine between guide plates 38 and 39, adjustably secured to the top of the saw table 25 by a plurality of binding screws 40 (Fig. 1). A pair of guide rolls 41 are rotatably mounted in the guide plates 38 and 39 and engage the upper surface of the carrier plate 37.

The plate 37 is grooved longitudinally on its upper surface, as indicated at 42, and is provided with rack teeth 43 at the bottoms of the grooves 42. Pinions 44 (Figs. 3 and 4) engage the rack teeth 43 and are mounted upon a feed shaft 45 supported in bearings in the guide plates 38 and 39 and also in an additional bearing 46 (Fig. 3) mounted on the saw table 25.

A large pulley 47 is secured to the end of the shaft 45 and may be rotated by a belt 48 (Fig. 2) from any suitable source of power. The pulleys 14 and 47 are so proportioned and connected that the saws S will rotate at relatively high speed, while the feed shaft 45 will rotate at relatively slow speed.

Having described the construction of my improved sawing machine, the operation thereof will be readily apparent. The carrier plate 37 is moved toward the operator or to the left in Fig. 1 far enough so that one of the battery plates can be inserted in the slots 38 on the under side of the table, the carrier plate meanwhile being held from displacement by one of the rolls 41. The plate 37 is then pushed rearward until the pinions 44 engage the rack teeth 43, after which the plate is fed slowly rearward past the saws S. At the same time, the plate is held firmly down by the rolls 41 and also by the feeding pressure of the pinions 44.

It will be noted, however, that the entire saw table 25, with the carrier plate and its driving mechanism, is free to swing upward to relieve the saws if the drag or pressure becomes great enough to overcome the weight of the saw table and the parts mounted thereon.

In this manner the separator plate P is firmly supported and is fed past the saws in such a position that the continuous flat portion of the plate will be slotted from side to side, while the ribs 36 remain intact and hold the slotted parts of the separator plate together.

My improved sawing machine has been found to be unusually well adapted to the production of separator plates such as are shown in the drawings, but is also capable of general application and may be used to advantage for producing other similar articles.

Having thus described my invention and the advantages thereof, I do not wish to be limited to the details herein disclosed otherwise than as set forth in the claims, but what I claim is:—

1. A sawing machine comprising a fixed frame, a gang of saws and means for rotating them and a notched stripper and a brush carried by the frame, a table pivoted at one end to the top of the frame free for upward turning movement, an adjustable stop for the free end of the table, a carrier plate having transverse slots on its under face confronting the saws and slidably mounted in longitudinal ways provided in the saw table, and rack-and-pinion feed mechanism and roller guides carried by the table and co-operating with the upper face of the carrier plate.

2. A sawing machine comprising a carrier plate having transverse grooves adapted to receive ribs on the work and to properly present the work for sawing, a gang of saws confronting the grooved face of the plate, and means for presenting the work to the saws in position for them to slit the work but not the ribs.

WALTER BARNARD STONE.